Figure 1:
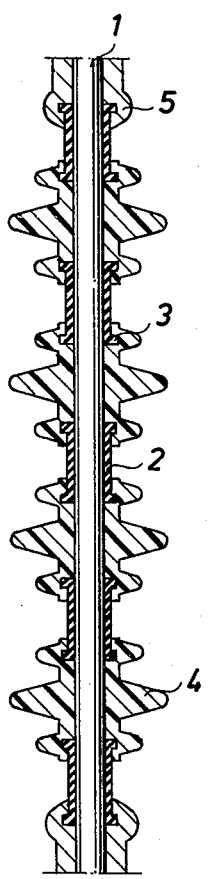

United States Patent [19]

Winkler et al.

[11] 4,373,113
[45] Feb. 8, 1983

[54] HIGH-VOLTAGE POLYMERIC INSULATOR WITH SHEATH OF ELASTIC AND RIGID SEGMENTS AND METHOD OF MAKING SAME

[75] Inventors: Jerzy Winkler; Jerzy Stankiewicz, both of Wrocław, Poland

[73] Assignee: Instytut Elektrotechniki Oddzial Technologii i Materialoznawstwa Elektrotechnicznego, Wrocław, Poland

[21] Appl. No.: 186,296

[22] Filed: Sep. 11, 1980

[30] Foreign Application Priority Data

Sep. 15, 1979 [PL] Poland .................................. 218354

[51] Int. Cl.³ ...................... H01B 17/02; H01B 19/00
[52] U.S. Cl. ...................................... 174/179; 29/631; 174/186; 264/251; 264/254
[58] Field of Search ............... 174/176, 177, 178, 179, 174/186, 209; 29/631; 264/251, 254, 255

[56] References Cited

U.S. PATENT DOCUMENTS

| 3,898,372 | 8/1975 | Kalb ..................................... 174/179 |
| 4,246,696 | 1/1981 | Bauer et al. ..................... 174/209 X |

FOREIGN PATENT DOCUMENTS

| 1490529 | 8/1975 | Fed. Rep. of Germany ... 174/137 B |
| 2511809 | 9/1976 | Fed. Rep. of Germany ...... 174/179 |
| 1353299 | 1/1964 | France ................................ 174/178 |
| 2105285 | 4/1972 | France ................................ 174/179 |
| 44-20152 | 8/1969 | Japan .................................. 174/179 |
| 91353 | 11/1977 | Poland ................................ 174/179 |

Primary Examiner—Laramie E. Askin
Attorney, Agent, or Firm—Michael N. Meller; Anthony H. Handal

[57] ABSTRACT

An insulator comprising a rod made of continuous glass fiber impregnated with epoxy resin, metal end fittings, and a polymeric sheath. The rod is tightly embedded in the sheath and the ends of the rod are pressed into the fittings. The sheath consists of alternately mounted segments of two types: spacing sleeves made of elastic material and externally profiled sleeves made of stiff material. The spacing sleeve has beads at the ends. In order to transfer axial forces, the spacing sleeves are partly covered by the profiled sleeves, said covered portion including the beaded ends. The method by which this insulator is made consists in that, first, the spacing sleeves, made of silicone rubber, are cast directly onto the rod by the pressure-injection method; second, the rod is covered by a layer of adhesive agent from the silicone group and, third, in the interspaces formed between the spacing sleeves, the profiled sleeves are cast in a split mold by means of the injection method. The split mold covers the fragments of the spacing sleeves, some of which are used as the packing of the split mold. According to the thickness of the rod and the required mechanical strength of the insulator, the length of the rigid segments is selected so that in the connecting layer the permissible internal stresses, due to variable temperature and load conditions during operation, are not exceeded. The material for the rigid segments is a cast epoxy composition.

5 Claims, 4 Drawing Figures

HIGH-VOLTAGE POLYMERIC INSULATOR WITH SHEATH OF ELASTIC AND RIGID SEGMENTS AND METHOD OF MAKING SAME

This invention relates to an outdoor polymeric insulator for high voltages, especially for those greater than 110 kV, having high mechanical strength; as well as the method by which it is made.

Outdoor polymeric insulators of high mechanical strength comprise a core in the form of a rod constructed from a continuous alkaline-free glass filament impregnated with an organic binder, usually epoxy resin, and an insulating sheath made of a thermo- or chemosetting material, in which the core is embedded. The desired mechanical strength of the insulator is achieved by choosing the proper thickness of the rod, the length of which depends on the working and test voltages of the insulator.

Federal Republic of Germany Printed Patent Application No. 2,044,179 describes polymeric insulators with a glass-fiber core (such also being known from Federal Republic of Germany Printed Patent Applications 1,490,529 and 1,515,766, referred to therein). The sheath of such an insulator is a rigid thermosetting epoxy cast insulation which has been cast directly onto the core which is placed in the mold before casting. Insulators obtained by this method have a stiff construction which, when the length of the insulator exceeds 1 m, results in fracturing of the insulating sheath, thus promoting failure of the whole insulator. On the other hand, the application of dilatation layers between the sheath and the core makes the construction of the insulator difficult.

Federal Republic of Germany printed application No. 2,044,179 also gives the description of a polymeric insulator and specifies its construction. This insulator consists of an epoxy-glass fiber rod carrying elastic silicone elastomer sheds. Both ends of the rod are fixed into the end fittings. Particular sheds of this insulator are subsequently cast onto the ready-made rod. On a vertically placed rod a tight-fitting mold is installed which can be slid along the rod after which a proportioned amount of silicone elastomer is cast into it. Before the completion of the polymerization process the mold is shifted by the length corresponding to one shed and, once again, a certain portion of silicone elastomer is cast into the mold so that the liquid covers the lower part of the higher shed thus ensuring a tight and long-lasting connection between particular sheds. The method of constructing such insulators is labor-consuming, and in the case of lot production, it requires special instrumentation which in practice presents many technological difficulties.

U.S. Pat. No. 3,898,372, gives an example of a polymeric insulator in which a sequence of ethylene-propylene copolymer sheds is fixed on a fiber-glass rod impregnated with epoxy resin. The sleeves designed for fixing the sheds on the rod have labyrinth cuts on the inside. The lower part of the sleeve and the upper part of the disk of a particular shed are fitting. The sheds are made separately and then mounted successively onto the rod. The channels formed by the cuts in the sleeves are filled with silicone grease. After installing all of the sheds on the rod, the insulator is subjected to a pressure along its axis to ensure a tight fit between individual sheds and to seal the gaps between them. Finally, the end fittings are mounted. This method makes the construction of even very long insulators possible. However, because of certain deviations from the technological parameters which are likely to occur during construction, complete tightness between the sheath and the rod cannot be ensured, in particular under heavy service conditions i.e. during pronounced fluctuations of temperature which may result in outflow of silicone grease or ingress of moisture into the gaps between the sheath and the rod.

Polish Pat. No. 91,353 specifies the construction of a high-voltage outdoor rod-insulator. This insulator is designed for a trolley wire of a contact line. The core of this insulator is a rod or a resin-bound glass-fiber pipe. Both ends of the pipe are pressed into the end fittings. During installation of the insulator a tubular insulating sheath is mounted onto the core of the insulator and a ring-shaped gap between the core and the sheath is filled with thixotropic dilatation paste. The edges of the sheath mounted in the sleeve sections of the end fittings are sheared along the plane parallel to the inner parts of the end fittings, which have, in their terminal sections, furrowed cuts containing packings supported by stop rings which are additionally sealed from the outside by means of a thixotropic dilatation paste layer. The sheath of the insulator is made of cycloaliphatic epoxy resin hardened by an aliphatic or cycloaliphatic hardener with the admixture of a filler composed of a quartz flour mixed with hydrated aluminum oxide. The thixotropic paste filling the gap is obtained from a semifluid silicone compound with the addition of colloidal silica and silicone oil of a proper viscosity. This paste is introduced into the insulator gap by means of a special technological device using a vacuum-pressure method. In practice, the above method makes it possible to construct insulators designed for 110 kV and 1 to 1.2 m long. With greater dimensions the problem arises of obtaining a proper mechanical strength of the insulating sheath. Moreover, considering the dimensions, the weight, and the technique of casting into molds the technological process itself is rendered difficult.

The properties of polymeric outdoor insulators show that the best operating parameters are obtained with the highest voltages. However, the prior construction technologies are profitable only within the range of mean voltages up to 110 kV at most. At higher voltages, e.g. 220 kV or 400 kV, as the length of the insulator is increased, the casting of individual sheds becomes increasingly laborious and time-consuming.

A complete casting of the sheath when the length of the insulator exceeds 1 m is rendered extremely difficult because of the weight of the mold and the method of its casting. An epoxy resin casting exceeding 1 m in length exhibits a very poor cooperation between the rigid sheath material and the elastic epoxy-glass core. In addition, difficulties are encountered when these two castings are joined since the joint is always the weakest point of the sheath, thus increasing the likelihood of its damage. On the other hand, the sheath made of silicone elastomers is costly to make because of the price of the material, so that use of insulators made only from elastic cast profiles is economically unjustified.

The invention relates to a high-voltage outdoor polymeric insulator comprising a rod constructed from a continuous alkaline-free glass filament impregnated with epoxy resin and terminated with metal end fittings, and an insulating sheath mounted tightly onto the polymeric rod. The essence of the invention consists in that the sheath is made from two types of segments mounted alternately directly on the rod, i.e. a segment made of elastic material, preferably silicone elastomer, and a segment made of a rigid material, preferably epoxy cast insulation. The elastic segment is a spacing sleeve which has beads, at least at the ends. The rigid segment is a sleeve which is profiled at the outside and which tightly covers the fragments of the spacing sleeve. This connection between the rigid elements and the elastic elements, i.e., the interlocking of the profiled sleeve with the beads of the spacing sleeve, provides a means for the transfer of axial forces. An advantageous cooperation within the system rod rigid segment-elastic segment is obtained in the case when the spacing sleeves have at their central part beads with sloping sides to which the faces of the profiled sleeves adhere. In order to avoid a gap between the rigid element and the elastic element it is advisable that the spacing sleeve have beads with sloping sides and that the profiled sleeves partly cover these beads. From the technological point of view it is advantageous when the beads have a collar around their surface. The invention also includes the method of constructing said high-voltage outdoor polymeric insulator. In this method a polymeric insulating sheath is tightly mounted onto the ready-made rod of fiber-glass reinforced by epoxy resin. Essentially this method consists of the following steps: First, the rod is covered with a layer of an adhesive agent from the silane group. Second, the silicone rubber spacing sleeves are cast at intervals directly onto the rod by means of pressure-injection molding technology. Third, the externally profiled sleeves are cast in split molds using the injection pressure method, at the formed interspaces between the spacing sleeves so that the fragments of the spacing sleeves are covered.

The material used for the externally profiled sleeves is a cast epoxy composition consisting of a cycloaliphatic epoxy resin, anhydride hardener and inorganic filler. The fragments of the previously made elastic sleeves are used as the packings of the split mold. The insulator according to the invention can have any length and can be used for any high voltage. This has been achieved by means of the sectional sheath consisting of rigid and elastic segments, between which connections are formed to transfer axial forces, alternately mounted onto the elastic rod, the diameter of said rod being chosen according to the desired mechanical strength for the working and test voltages of the insulator. It is thus possible to determine for a given construction of the insulator the maximum length of the rigid segments at which permissible internal stresses in the joint layer are not exceeded under the temperature and load conditions of operation. Covering the rod with elastic segments made of a relatively thin silicone elastomer layer, which adequately protects the core against the ingress of moisture, and with rigid elements of externally formed surface allows one to obtain:

the necessary creepage length for the whole insulator
flexibility of the sheath in relation to the rod so that
  the sheath cooperates with the rod in such a way
  that the stresses under heavy service conditions do not result in fracture
an economically profitable cost of the insulator due to
  the reduced amount of silicone elastomer material
  required.

Besides the advantage of high reliability, the insulator according to the invention is many times smaller than the prior known insulators made of inorganic materials and designed for the highest voltages, of e.g. 220 kV or 400 kV. The insulator according to the invention is far less complex in its construction and is less expensive as compared with those insulators having a sheath consisting only of elastic silicone elastomer sheds. The sectional construction of the sheath makes it possible to use a heavy-duty automatic pressure gelation process for thermosetting casting mixes. Elastic segments of the sheath are simultaneously used as the packing of the split mold during casting of the rigid segments, which considerably simplifies the construction of the mold. Due to this it is possible to avoid the vacuum casting method used in constructing insulators with a rigid sheath, which limited the length of the insulator due to the difficulties encountered in trying to achieve the partial vacuum over a sufficiently great space.

Figure 2:
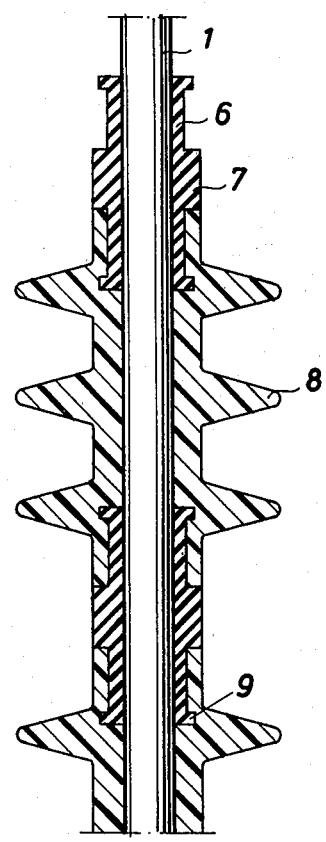
Figure 3:
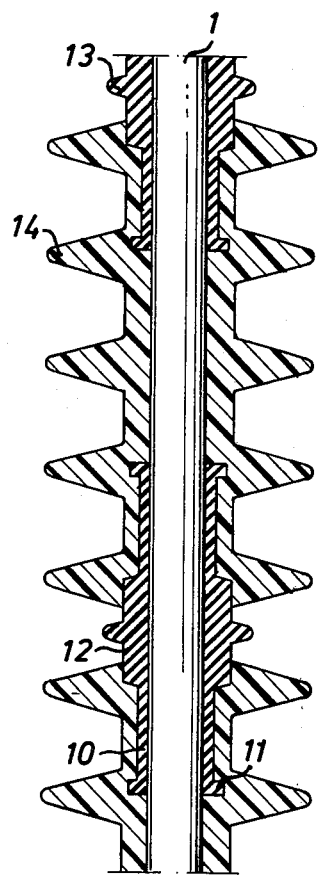

Exemplified embodiments of the invention are explained with reference to the accompanying drawings where FIG. 1 gives the lengthwise section of the insulator according to Example I, FIG. 2 gives the same section of the fragment of the insulator according to Example II and FIG. 3 gives the same section of the fragment of the insulator according to Example III.

Figure 4:
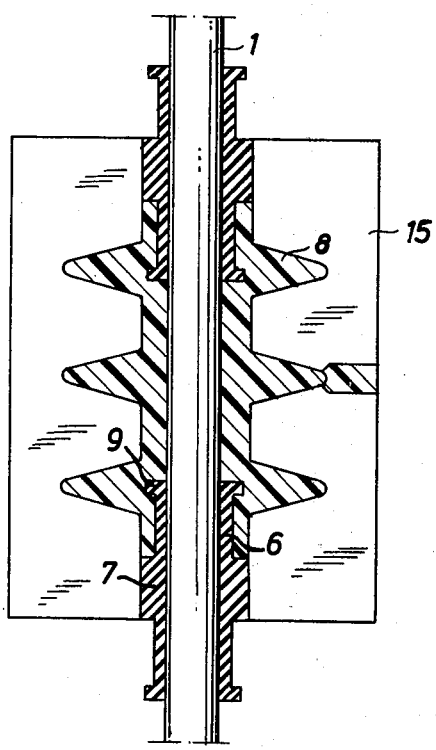

FIG. 4 is the lengthwise section of the fragment of the insulator according to Example II with a half of the split mold used in casting the rigid segment.

EXAMPLE I

The core of the insulator is a rod 1 formed from alkaline-free continuous glass filament impregnated with liquid epoxy resin and anhydrous hardener. Spacing sleeves 2 are tightly mounted at equal intervals onto the rod 1. The sleeves 2 are made of silicone rubber. The spacing sleeves 2 are terminated with beads 3. Externally profiled sleeves 4 with three ribs, wherein the central rib is higher than the remaining two, are mounted onto the rod 1 at the interspaces between the spacing sleeves 2. The profiled sleeves 4, made of epoxy cast insulation, cover the beads 3 of the spacing sleeves 2 and also fragments of their external surface. The bead 3 provides the packing between the spacing sleeve 2 and the profiled sleeve 4 and, at the same time, the packing of the whole insulator sheath consisting of sleeves 2 and 4 in relation to the rod 1. The terminal spacing sleeves 2 are tightly mounted in the end fittings 5 of the insulator.

EXAMPLE II

The core of this insulator is the same rod 1 as that described in Example I, and again the spacing sleeves 6 are made of silicone rubber and tightly mounted on the rod. At the mid-length the sleeves 6 have external beads 7. The profiled epoxy sleeve 8 mounted on the rod 1 at the interspaces between the spacing sleeves 6 has three ribs each of equal size. The faces of the sleeves 8 adhere to the sides of the bead 7. As in Example I the spacing sleeves 6 are terminated with the beads 9 which are enclosed within the inner part of the profiled sleeves 8 which also cover the whole surface of the spacing sleeves 6 up to the central bead 7.

EXAMPLE III

This insulator is constructed from the same materials as those used in Examples I and II. The spacing sleeves 10, terminated with the beads 11 and having in their central part beads 12 with sloping sides, are tightly mounted on the rod 1. The central beads 12 have a collar 13 around their surface. The profiled sleeves 14 with equal ribs cover the beads 11, the external surface of the spacing sleeves 10, and parts of central beads 12, completely covering their sloping sides.

EXAMPLE IV

The method described in this example relates to the making of the insulator described in Example II. First, the prefabricated rod is surface-treated with an adhesive agent of quick-drying silane material. Second, directly on the rod 1 at selected intervals, in split molds, spacing sleeves 6 are cast of liquid silicone rubber, which is cold-hardened at an ambient temperature. In the interspaces formed between the spacing sleeves 6, the externally profiled sleeves 8 are cast by means of the injection method, wherein the mold 15 encloses the beads 9 and the outer surfaces of the spacing sleeves 6. The outer surfaces of the central beads 7 of the spacing sleeves 6 serve as the packing of the mold 15. The profiled sleeves 8 are made from liquid epoxy composition composed of cycloaliphatic epoxy resin, anhydride hardener, and inorganic filler. External surfaces of the beads 7 of the spacing sleeves 6 are used as the packing of the split mold 15.

What we claim is:

1. A high-voltage outdoor polymeric insulator comprising:
   (a) a prefabricated rod of alkaline-free continuous glass filaments impregnated with epoxy resin, the ends of the rod being pressed into end fittings;
   (b) at least two spacing sleeves made of elastic material and having a bead at each end of each spacing sleeve;
   (c) an externally profiled sleeve made of rigid material and positioned between each two of said spacing sleeves so as to form alternating elastic and rigid segments of insulating sheath around said rod and to partly cover both spacing sleeves; wherein at least the bead at the end of each spacing sleeve is covered by the adjacent profiled sleeve, said bead interlocking with said profiled sleeve so as to preclude slippage of said profiled sleeve relative to said spacing sleeve; and wherein the bead at the end of a spacing sleeve adjacent to an end fitting interlocks with said end fitting.

2. The insulator as in claim 1, wherein in the central part of each spacing sleeve there is a bead to whose sides the adjacent end face of a profiled sleeve adheres.

3. The insulator as in claim 1, wherein in the central part of each spacing sleeve, there is a bead having sloping sides, each sloping side being covered by an adjacent profiled sleeve.

4. The insulator as in claim 3 wherein the bead in the central part of the spacing sleeve has a collar around its surface.

5. A method of making a high-voltage outdoor polymeric insulator having a sheath mounted onto a prefabricated glass-fiber rod comprising the steps of:
   (a) first, surface-treating said rod with a silane adhesive agent;
   (b) second, casting silicone rubber spacing sleeves with beads at the ends of said spacing sleeves, directly onto the rod at selected intervals by pressure-injection; and
   (c) third, casting profiled sleeves in the spaces between said spacing sleeves so as to cover said beads and interlock therewith, said casting being carried out in a split mold by injection, wherein the material of said profiled sleeves is a cast epoxy composition consisting of cycloaliphatic epoxy resin, anhydride hardener, and an inorganic filler.

* * * * *